(12) United States Patent
Iseyama et al.

(10) Patent No.: US 6,223,038 B1
(45) Date of Patent: Apr. 24, 2001

(54) LOCATION REGISTRATION METHOD FOR MOBILE RADIO COMMUNICATION SYSTEM

(75) Inventors: Takayuki Iseyama; Shiro Kadoshima, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/119,266

(22) Filed: Jul. 20, 1998

(30) Foreign Application Priority Data

Feb. 18, 1998 (JP) .................................................. 10-035878

(51) Int. Cl.[7] ..................................................... H04Q 7/20
(52) U.S. Cl. ........................................... 455/435; 455/433
(58) Field of Search .................................... 455/432, 433, 455/435, 445, 462, 463, 517, 524

(56) References Cited

U.S. PATENT DOCUMENTS

| | | | |
|---|---|---|---|
| 5,577,103 | * 11/1996 | Foti ....................................... | 455/435 |
| 5,873,041 | * 2/1999 | Ishii ...................................... | 455/435 |
| 5,926,760 | * 7/1999 | Khan et al. ........................... | 455/435 |
| 6,041,234 | * 3/2000 | Oksanen et al. ...................... | 455/435 |

FOREIGN PATENT DOCUMENTS

| | | |
|---|---|---|
| 6165434 | 12/1981 | (JP) . |
| 5300082 | 11/1993 | (JP) . |
| 1245639 | 10/1996 | (JP) . |

* cited by examiner

Primary Examiner—Reinhard Eisenzopf
Assistant Examiner—Sam Bhattacharya
(74) Attorney, Agent, or Firm—Helfgott & Karas, P.C.

(57) ABSTRACT

The location information can be rapidly restored in a home location register HLR and occurrence of abnormal traffic at the time of restoring the contents of the home location register can be prevented. A location registration request to the base stations located in the location registration area associated with the home location register is issued when the location information stored in the register should be restored. The base stations receive the location registration request, and send the broadcast information including location registration executing request information. The mobile stations execute the location registration process upon receipt of the location registration executing request. In this case, the mobile stations are arranged in a plurality of groups in order to avoid a situation in which a large number of mobile stations concurrently execute the location registration process. The location registration process is executed for each group at respective, different timings in order.

11 Claims, 13 Drawing Sheets

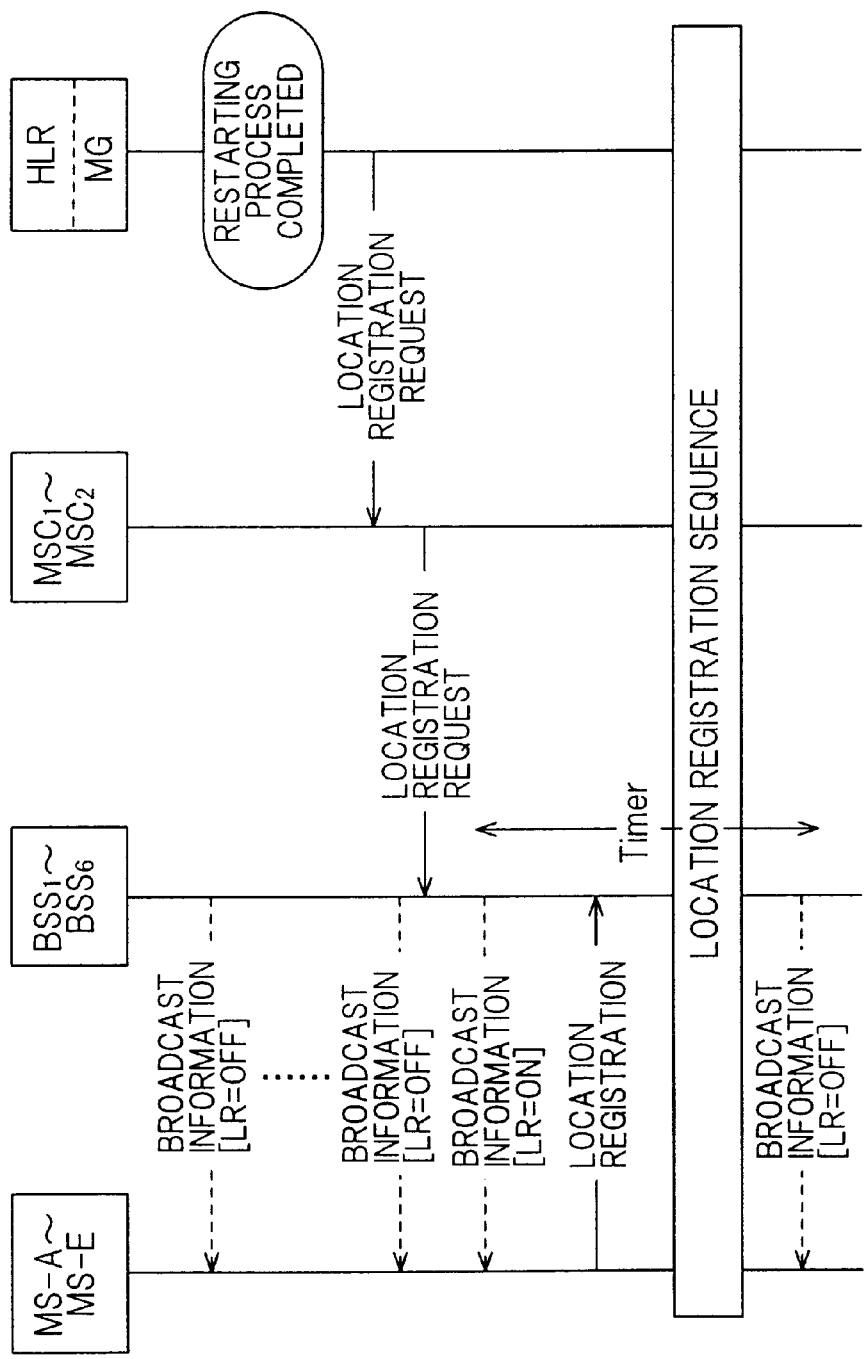

FIG.3

BROADCAST INFORMATION

| INFORMATION ELEMENT |
| --- |
| MESSAGE TYPE |
| NETWORK NUMBER |
| INFORMATION ON RESTRICTION |
| CONTROL CHANNEL STRUCTURE INFORMATION |
| MOBILE STATION TRANSMISSION POWER SPECIFICATION |
| WAIT PERMISSION LEVEL |
| WAIT DEGRADATION LEVEL |
| NUMBER (N) OF MULTIPLEXED LOCATION REGISTRATION AREAS |
| LOCATION NUMBER |
| ⌇ |
| LOCATION NUMBER |
| MAXIMUM NUMBER OF CHANNELS REPORTED |
| NUMBER (M) OF PERCH CHANNELS FOR LOCATED ZONE/SECTOR DISCRIMINATION |
| PERCH CHANNEL NUMBER |
| ⌇ |
| PERCH CHANNEL NUMBER |
| LOCATION REGISTRATION TIMER |
| LENGTH (K) OF EXTENDED INFORMATION ELEMENT |
| ( EXTENDED INFORMATION ELEMENT ) |

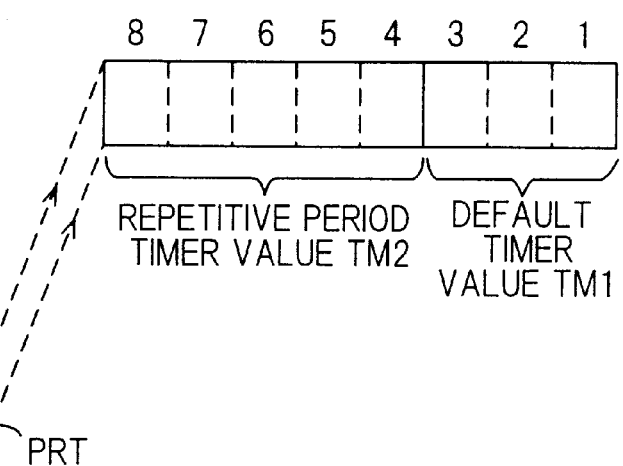

PRT 8 7 6 5 4 3 2 1

REPETITIVE PERIOD TIMER VALUE TM2 — DEFAULT TIMER VALUE TM1

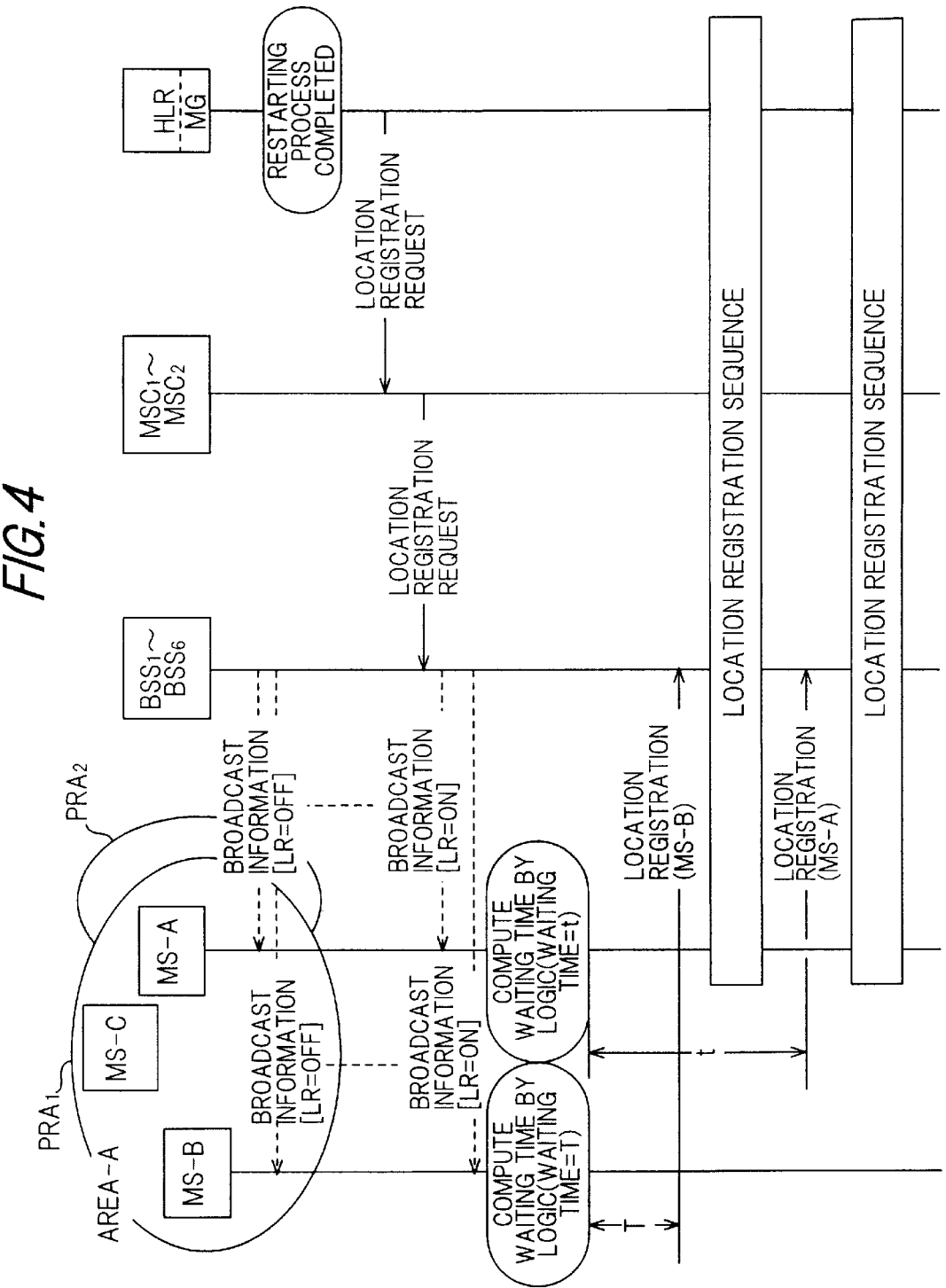

LOCATION REGISTRATION METHOD FOR MOBILE RADIO COMMUNICATION SYSTEM

BACKGROUND OF THE INVENTION

The present invention relates to location registration methods for mobile radio communication systems, and more particularly, to a location registration method directed to a situation in which a fault occurs in a memory device (home location register: HLR) which stores and manages information concerning the locations of mobile stations and thus the location information is lost.

In a mobile radio communication system, base stations broadcast common information such as a location registration area number to all mobile stations located within cells thereof. The mobile stations refer to the broadcasted information, and watch whether they move to location registration areas different from those in which the mobile stations are located at present. Then, the mobile stations send location registration signals to a mobileservices switching center via the base stations, if the mobile stations move to the different location registration areas. On the basis of the received location registration signals, the mobile services switching center registers, in a home location register HLR, subscriber data on the mobile stations and location information indicating location registration areas in which the mobile stations are located. When a gateway mobileservices switching center receives a call directed to a mobile station, it looks up the location information stored in the home location register HLR, and identifies a mobileservices switching center corresponding to the location registration area in which the called mobile station is located. Then, the gateway mobileservices switching center causes the identified mobileservices switching center to perform simultaneous paging through a plurality of base stations located within the location registration area in which the called mobile station is located.

FIG. 11 schematically shows a mobile radio communication system. Mobile stations $MS_1$–$MS_6$ are terminals which can perform two-way radio communications with base stations $BS_1$–$BS_6$, respectively. The base stations $BS_1$–$BS_6$ can communicate with the mobile stations $MS_1$–$MS_6$ located within radio zones or cells $C_1$–$C_6$ formed around the base stations $BS_1$–$BS_6$, respectively. The radio zones $C_1$–$C_3$ of the base stations $BS_1$–$BS_3$ form a location registration area (or a simultaneous paging area) $PRA_1$, and the radio zones $C_4$–$C_6$ of the base stations $BS_4$–$BS_6$ form another location registration area (a simultaneous paging area) $PRA_2$.

Mobileservices switching centers $MSC_1$–$MSC_2$ have the functions of realizing call connecting control and service control directed to providing mobileservices. The mobileservices switching center $MSC_1$ is connected to the base stations $BS_1$–$BS_3$ and the mobileservices switching center $MSC_2$ is connected to the base stations $BS_4$–$BS_6$. A gateway mobileservices switching center GS accepts, from another network, calls directed to its own network subscribers or calls directed to roaming subscribers, and is connected to the mobileservices switching centers $MSC_1$–$MSC_2$ located within its own network through communication lines. Further, the gateway mobileservices switching center GS is connected to a home location register HLR via a control signal line in order to make inquiries of the location information.

The home location register HLR is a database which stores subscriber data and location information on the mobile stations $MS_1$–$MS_6$ located in the location registration areas $PRA_1$–$PRA_2$. The mobileservices switching centers $MSC_1$–$MSC_2$ receive the location registration signals from the mobile stations $MS_1$–$MS_6$, so that the contents of the home location register HLR can be updated and new subscriber data and/or location information can be registered therein.

If a call directed to the mobile station $MS_1$ is received, the home location register HLR is referred to, and the simultaneous paging is carried out by all the base stations $BS_1$–$BS_3$ forming the location registration area $PRA_1$ in which the called mobile station is located. A backup memory HLR' backs up the contents of the home location register HLR.

FIG. 12 schematically shows a location registering and call receiving sequence in the mobile radio communications.

The base stations $BS_1$–$BS_3$ notify, by using the broadcast information, the mobile stations $MS_1$–$MS_3$ of information concerning location registration. When the mobile station $MS_3$ (see FIG. 11) which is located in the location registration area $PRA_1$ moves to the location registration area $PRA_2$, as shown in FIG. 13, the mobile station $MS_3$ detects a change of the location registration area by referring to the information broadcasted from the base stations $BS_4$–$BS_6$. Thus, the mobile station $MS_3$ transmits the location registration signal, which is sent to the mobileservices switching center $MSC_2$ via any of the base stations $BS_4$–$BS_6$. The mobileservices switching center $MSC_2$ executes a certifying process upon receiving the location registration signal. If the result of the certifying process is affirmative, the mobileservices switching center $MSC_2$ instructs the home location register HLR to register a routing number directed to the switching center $MSC_2$ and the location information indicating the location registration area in which the mobile station $MS_3$ is located, and sends a location registration admission signal back to the mobile station $MS_3$. Then, the above location registration sequence executed when the mobile station moves to another location registration area is ended.

When the gateway mobileservices switching center GS receives a call directed to the mobile station $MS_3$, the switching center GS extracts the subscriber identification number (mobile station identification number) of the mobile station $MS_3$ from the received dial number. Then, the mobileservices switching center GS reads the location information (routing number) concerning the mobile station $MS_3$ from the home location register HLR on the basis of the extracted subscriber number, and sets a line to the mobileservices switching center $MSC_2$ indicated by the routing number. Hence, the mobileservices switching center $MSC_2$ instructs all the base stations $BS_4$–$BS_6$ in the location registration area $PRA_2$ to perform the simultaneous paging. In response to the simultaneous paging, the mobile station $MS_3$ sends an acknowledgement signal to the mobileservices switching center $MSC_2$ via one of the base stations $BS_4$–$BS_6$. In response to the acknowledgement signal, the mobile services switching center $MSC_2$ sets up an idle communication channel TCH by a well-known process. Hence, the channel connection is established.

Hence, even if the mobile station moves to anywhere, the location information concerning the location registration area in which the mobile station is located can be updated and validated in the home location register HLR. Thus, calls directed to mobile stations from another network can be accepted.

When the home location register HLR is restarted due to a certain factor such as a fault which occurs therein, all the contents thereof are reset. Hence, a maintenance station copies the contents of the home location register HLR to the backup memory HLR' at predetermined time intervals. The location information can be restored in the home location register HLR by using the backup information. However, the restored location information is only location information available at the restored time, and does not correctly indicate the real locations of the mobiles at the present time. Hence, the location information correctly indicative of the real locations of the mobile stations cannot be restored in the home location register HLR after it is restarted. In this case, calling of the mobile stations may fail. There are three conventional methods in order to modify the restored location information in the home location register HLR and correctly reflect the current situation. The first method is to wait for sending of the location registration signals from the mobile stations. The second method is to wait for the location registration signals sent when the mobile stations moves to different location registration areas. The third method is to prepare a particular message for requesting location registration in the air protocol.

However, the first and second methods have a disadvantage in that the location information cannot be rapidly restored in the home location register HLR. The third method has a disadvantage in that there is a need to provide a particular message in the air protocol and the related control is complicated.

SUMMARY OF THE INVENTION

An object of the present invention is to rapidly and correctly restore the location information in the home location register HLR when the location information concerning the mobile stations is lost due to a fault or the like. Another object of the present invention is to prevent occurrence of abnormal traffic resulting from an increased number of location registration signals sent when the home location register HLR is recovered from the fault and to efficiently utilize the system resources.

The above objects of the present invention are achieved by: issuing, when location information stored in the home location register HLR should be restored after a fault occurs, a location registration request to base stations located in a location registration area associated with the home location register HLR; sending, from the base stations which receive the location registration request, broadcast information including location registration executing request information; and sending the location registration signals from the mobile stations which receive the above location registration executing request information. Hence, the mobile stations are requested to execute the location registration, so that the location registration can rapidly and correctly be restored in the home location register HLR. Further, the location registration executing request information is merely added to the periodic location registration information field included in the existing broadcast information. Hence, there is no need to create a newly defined message for indicating the location registration and to send and receive it. Thus, the location registration can easily and simply be controlled and can be implemented.

The above objects of the present invention are also achieved by: issuing, when the location information stored in the home location register HLR should be restored after a fault occurs, a location registration request to the base stations located in a location registration area associated with the home location register HLR; sending, from the base stations which receive the location registration request, the broadcast information including location registration executing request information; determining, in mobile stations which receive the location registration request, respective start timings at which execution of the location registration is started on the basis of identification numbers (for example, mobile station identification numbers), each specifically assigned to and held in respective mobile stations; and sending the location registration signals from the mobile stations at the respective start timings. That is, the mobile stations execute the location registration at the different timings. Thus, it is possible to prevent abnormal traffic from occurring when the contents of the home location register HLR are restored and to efficiently utilize the system resources.

The above objects of the present invention are also achieved by: issuing, when the location information stored in the home location register HLR should be restored after a fault occurs, a location registration request to the base stations located in a location registration area associated with the home location register HLR; sending, from the base stations which receive the location registration request, the broadcast information including location registration executing request information at predetermined time intervals in order; and sending the location registration signals from the mobile stations which receive the location registration executing request information. In the above structure, the switching between the base stations which transmit the location registration executing request information is carried out so that a mobileservices switch center sends the location registration request to the base stations at given intervals in order, or the mobileservices switch center receives a location registration request acknowledgement from a base station and thus issues the location registration request to another base station. Hence, the mobile stations can be arranged in groups and the mobile stations in one of the groups are allowed to execute the location registration. Hence, it is possible to prevent abnormal traffic from occurring when the contents of the home location register HLR are restored and to efficiently utilize the system resources.

The switching between the base stations may also be carried out by adding the location registration executing request to the broadcast information and performing the following. That is, when the location registration request is issued to base stations via mobileservices switch centers, the location registration request is issued to the mobileservices switch centers one by one in first predetermined intervals in order. Each of the mobileservices switch centers that receive the location registration request issues the location registration request to the base stations in second predetermined intervals in order. Hence, it is possible to arrange the mobile stations in an increased number of groups and to prevent abnormal traffic from occurring when the contents of the home location register HLR are restored and efficiently utilize the system resources.

Other features and advantages of the present invention will be apparent from the following description taken in conjunction with the accompanying drawings.

BRIEF DESCRIPTION OF THE DRAWINGS

FIG. 2 is a diagram of a location registration sequence which is executed at the time of restarting the home location register HLR according to a first embodiment of the present invention;

FIG. 3 is a diagram showing location registration executing request information;

FIG. 4 is a diagram of a location registration sequence which is executed at the time of restarting the home location register HLR according to a second embodiment of the present invention;

Figure 1:
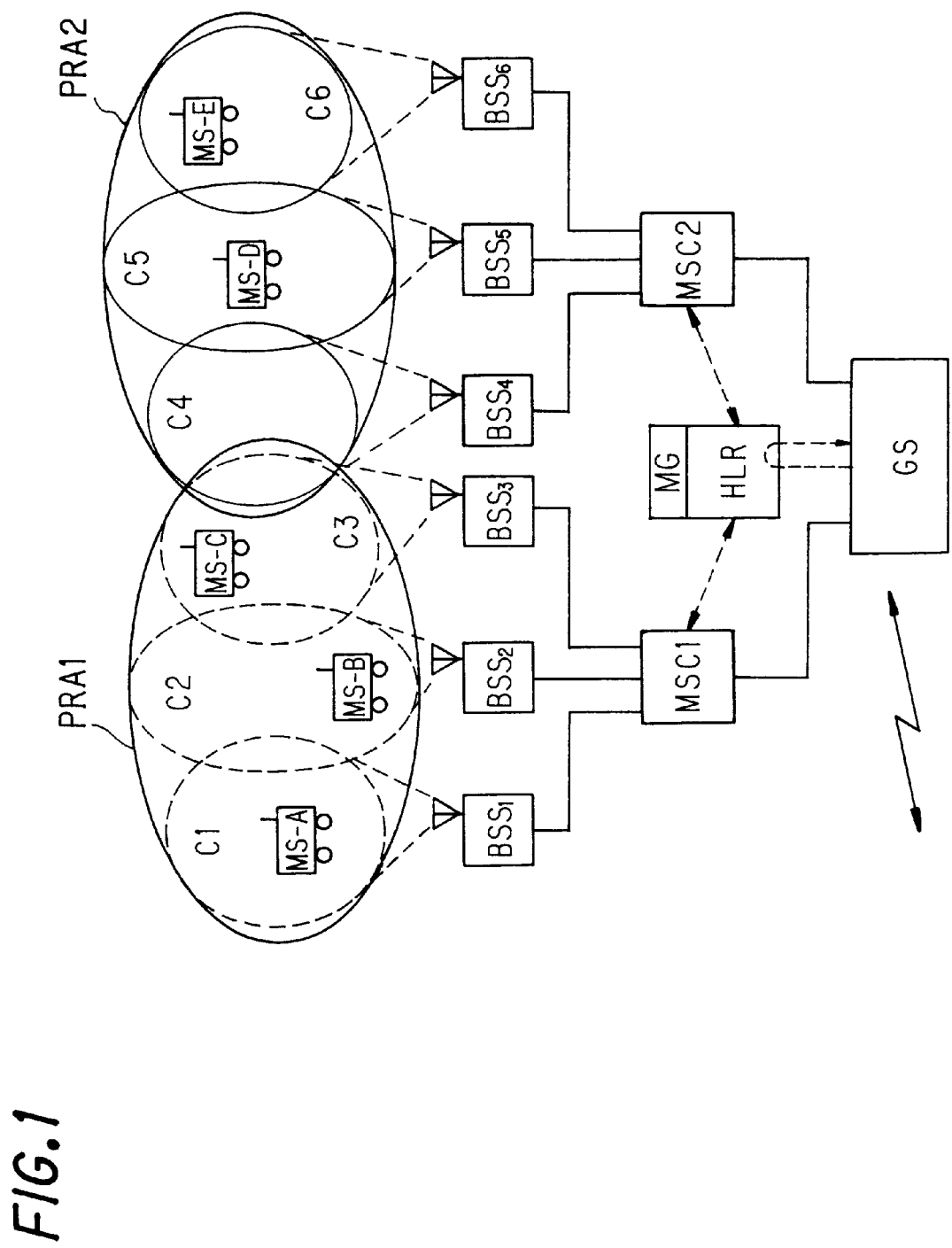
FIG. 1 is a diagram of a structure of a mobile radio communication system for explaining the present invention.

DESCRIPTION OF THE PREFERRED EMBODIMENTS (a) Structure of Mobile Radio Communication System:

FIG. 1 is a diagram of a structure of a mobile radio communication system of the present invention. The system shown in FIG.1 includes mobile stations MS-A through MS-E, base stations $BSS_1$ through $BSS_6$, mobileservices switching centers $MSC_1$ through $MSC_2$, a gateway mobileservices switching center GS, a home location register HLR, and a management part MG. The base stations $BSS_1$–$BSS_6$ have radio zones $C_1$ through $C_6$, respectively. The radio zones $C_1$–$C_3$ form a location registration area (roundup area) $PRA_1$, and the radio zones $C_4$–$C_6$ form a location registration area $PRA_2$. The mobileservices switching centers $MSC_1$ and $MSC_2$ realize the call connecting control and service control. The mobileservices switching center $MSC_1$ is connected to the base stations $BSS_1$–$BSS_3$, and the center $MSC_2$ is connected to the base stations $BSS_4$–$BSS_6$. The home location register HLR is connected to the mobileservices switching centers $MSC_1$ and $MSC_2$, and stores the subscriber information and location information concerning the mobile stations which are located within the location registration areas $PRA_1$ and $PRA_2$. The management part MG manages the home location register HLR. The gateway mobileservices switching center GS accepts calls directed, from another network, to its own network subscribers or roaming subscribers located within its own network, and is connected to the mobileservices switching centers $MSC_1$ and $MSC_2$ through communication lines. Further, the gateway mobileservices switching center GS is connected to the home location register HLR via a control signal line in order to make inquiries of the location information.

(b) Location Registration at the time of Restarting the Home Location Register according to First Embodiment:

FIG. 2 shows a location registration sequence which is executed when the home location register HLR is restarted according to the first embodiment of the present invention.

The management part MG which manages the home location register HLR executes a restart process for the register HLR when a fault of the register HLR is removed, and sends location registration request messages to the related mobileservices switching centers $MSC_1$ and $MSC_2$ after the restart process is completed.

Upon receiving the location registration request messages, the mobileservices switching center $MSC_1$ sends the location registration request message to the base stations $BSS_1$–$BSS_3$ under the center $MSC_1$, and similarly the mobileservices switching center $MSC_2$ sends the location registration request message to the base stations $BSS_4$–$BSS_6$ under the center $MSC_2$.

Upon receipt of the location registration request messages, the base stations $BSS_1$–$BSS_6$ use, for a given constant time, location registration executing request information which is newly provided, instead of the location registration information periodically obtained by the existing function. More particularly, each of the base stations $BSS_1$–$BSS_6$ writes the location registration executing request information in a respective location registration timer part PRT in broadcast information shown in FIG. 3, and then broadcasts it.

The location registration timer part PRT consists of eight bits, in which an initial timer value TM1 is defined by the three lower bits and a repetitive period timer value TM2 is defined by the five upper bits. The initial timer value TM1 specifies the time it takes for each mobile station to execute the periodic location registration for the first time after power on. The repetitive period timer value TM2 specifies time intervals at which the location registration is periodically carried out after the location registration is carried out for the first time. Originally, the eight bits of the location registration timer part PRT are not all zero simultaneously. Hence, when the eight bits of the location registration timer part PRT are all 1, the location registration executing request is defined as being ON (LR=ON). In other cases where the timer values are indicated, the location registration executing request is defined as being OFF (LR=OFF).

Upon receipt of the location registration executing request information (LR=ON) from the base stations $BSS_1$–$BSS_6$, the mobile stations MS-A through MS-E send the location registration signals. Hence, the conventional location registration sequence is carried out and the location information concerning each of the mobile stations MS-A through MS-E is registered in the home location register HLR.

The base stations $BSS_1$–$BSS_6$ continue to send the location registration executing requests (LR=ON) until the given constant time elapses. Hence, the locations of all the mobile stations that exist the location registration areas $PRA_1$ and $PRA_2$ are registered in the home location register HLR. When the given constant time elapses, the base stations $BSS_1$–$BSS_6$ return the location registration time parts PRT to the original values (the location registration executing request is turned off (LR=OFF)). Thus, it is possible to rapidly and correctly restore the location information concerning the mobile stations in the home location register HLR.

The above-mentioned first embodiment of the present invention has a possibility that a large number of location registration executing requests may concurrently be issued by the mobile stations and thus abnormal traffic may occur. With the above in mind, the following embodiments of the present invention arrange the mobile stations in groups, which are subjected to the location registration in order. Hence, traffic of location registration executing requests is distributed so that the occurrence of abnormal traffic can be prevented.

(c) Location Registration Executed at the time of Restarting the Home Location Register HLR according to the Second Embodiment:

FIG. 4 shows a location registration sequence which is executed when the home location register HLR is restarted according to the second embodiment of the present invention.

The management part MG which manages the home location register HLR executes the restarting process for the home location register HLR, and sends the location registration messages to all the mobileservices switching centers $MSC_1$–$MSC_2$ after the restarting process is completed.

Upon receiving the location registration request messages, the mobileservices switching center $MSC_1$ sends the location registration request message to the base stations $BSS_1$–$BSS_3$ under the center $MSC_1$, and similarly the mobileservices switching center $MSC_2$ sends the location registration request message to the base stations $BSS_4$–$BSS_6$ under the center $MSC_2$.

Upon receiving the location registration request messages, each of the base stations $BSS_1$–$BSS_6$ writes the location registration executing request information (LR=ON) in the respective location registration timer part PRT in the broadcast information (FIG. 3), and broadcasts the broadcast information. Upon receipt of the location registration executing request information (LR=ON) from the base stations $BSS_1$–$BSS_6$, the mobile stations MS-A through MS-E determine start timings T, t, . . . (T<t) for execution of the location registration by using specific numbers which are respectively assigned to the mobile stations and are held therein. For example, the mobile station MS-B sends the location registration signal at the first start timing T, so that the location information concerning the mobile station MS-B can be registered in the home location register HLR by the conventional location registration sequence. The mobile station MS-A sends the location registration signal at the second start timing t, so that the location information concerning the mobile station MS-A can be registered in the hole location register HLR by the conventional location registration sequence. Then, in the same manner as described above, the locations of all the mobile stations which are located in the location registration areas $PRA_1$ and $PRA_2$ are registered in the home location register HLR.

Figure 5:
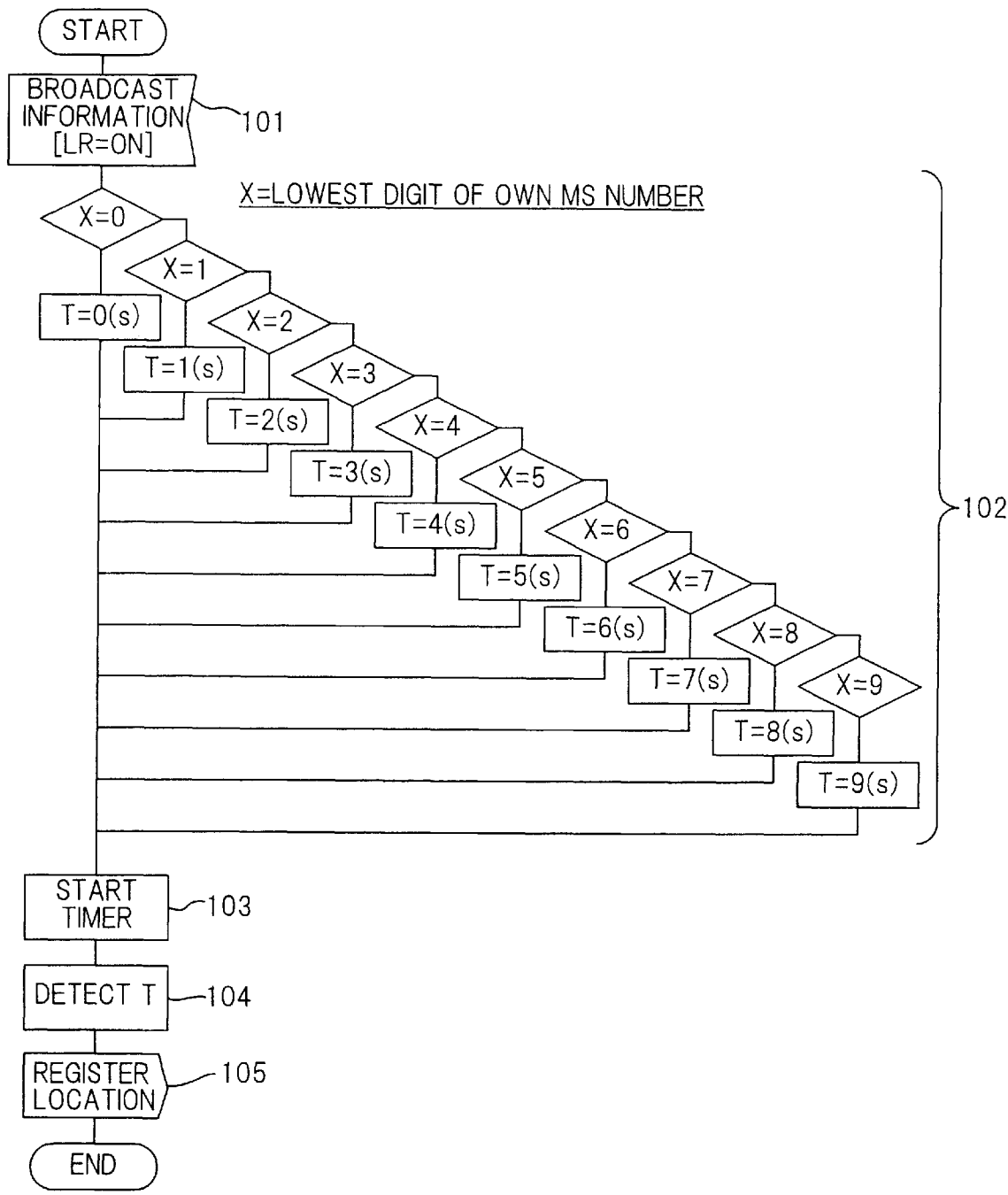
FIG. 5 is a flowchart of a location registration executing timing determination process.

FIG. 5 is a flowchart of a process for determining the timing for location registration, the process being carried out by each mobile station.

When the mobile station receives the location registration executing request information (LR=ON) (step 101), it is checked whether the lowest digit of the own identification number X is any of 1 to 9. If the lowest digit X is i (any of 1 to 9), the starting time of the location registration is set to the time which is i seconds later from the current time (step 103). When the timer indicates the starting time T for the location registration (step 104), the location registration is executed (step 105).

As described above, the mobile stations are grouped (10 groups in the embodiment shown in FIG. 5), and the location registration is executed in turn in order of groups one by one in order to avoid concurrent registration over groups. Hence, it is possible to prevent abnormal traffic from occurring when the contents of the home location register HLR are restored and to efficiently utilize the system resources.

Figure 6:
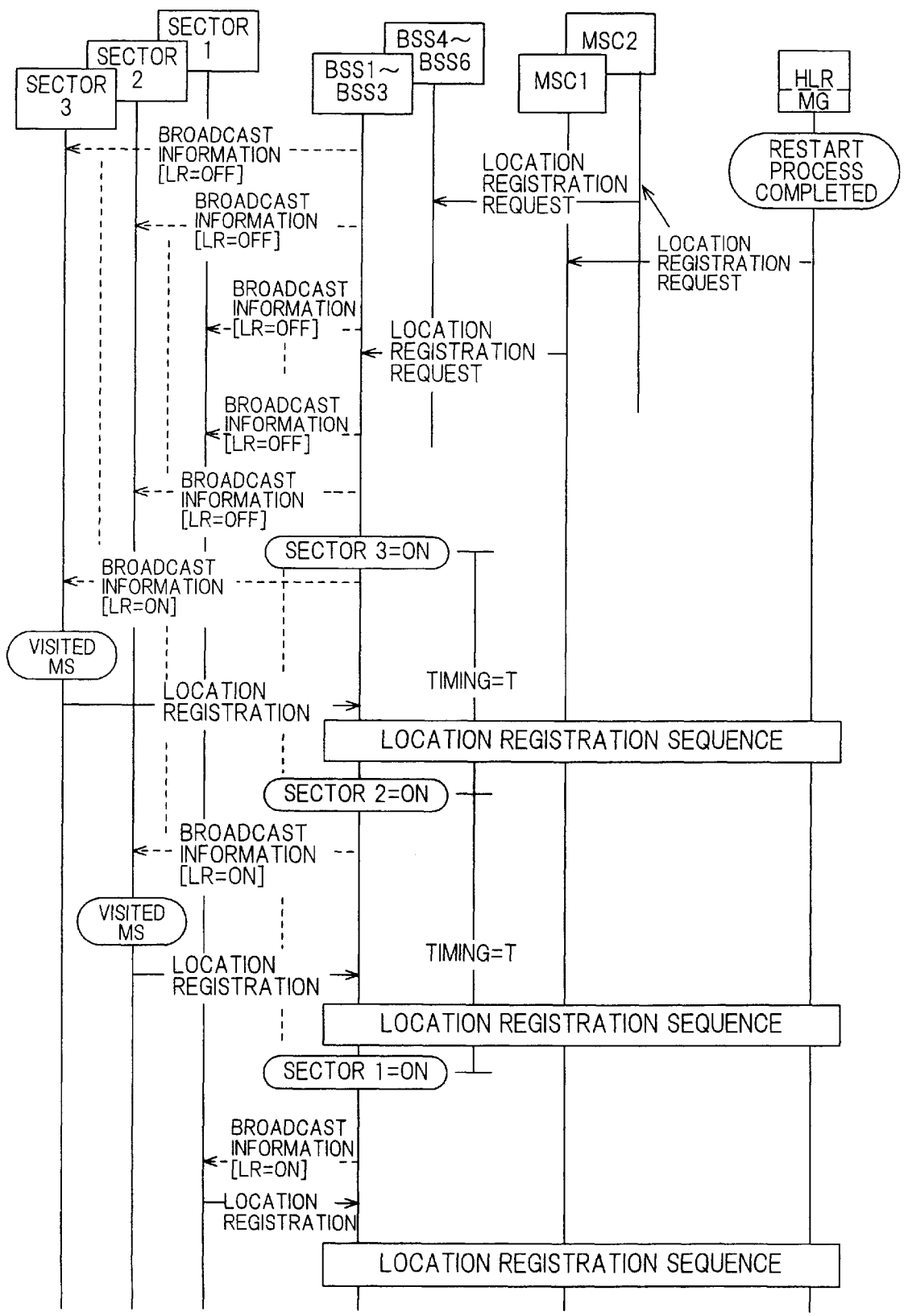
FIG. 6 is a diagram of a location registration sequence which is executed at the time of restarting the home location register HLR according to a third embodiment of the present invention.

(d) Location Registration Executed at the time of Restarting the Home Location Register HLR according to the Third Embodiment:

FIG. 6 shows a location registration sequence at the time of restarting the home location register HLR according to the third embodiment of the present invention.

The management part MG executes the restarting process for the home location register HLR due to a fault, and sends the location registration request messages to all the mobileservices switching centers $MSC_1$ and $MSC_2$.

Upon receiving the location registration request message, the mobileservices switching center $MSC_1$ sends the location registration request messages to the base stations $BSS_1$–$BSS_3$, and the mobileservices switching center $MSC_2$ sends the location registration request messages to the base stations $BSS_4$–$BSS_6$.

The base stations $BSS_1$–$BSS_3$ communicate with the mobile stations respectively located in the radio zones $C_1$–$C_3$ with different frequencies and different time slots. In order to disperse execution of the location registration, the location registration area $PRA_1$ is segmented into the radio zones $C_1$–$C_3$ (sector 1–sector 3), and the location registration of the mobile stations is carried out in order of sectors. That is, upon receiving the location registration request messages, the base stations $BSS_1$–$BSS_3$ communicate with each other, and insert the location registration executing request information (LR=ON) into the broadcast information so that the sending order can be determined. Alternatively, the sending order may be determined beforehand.

Then, the first base station $BSS_3$ sends, for a predetermined time T (for example, 10 seconds), the broadcast information including the location registration timer PRT into which the location registration executing request information (LR=ON) is inserted. The mobile station MS located in the sector 3 (radio zone $C_3$) receives the location registration executing request information (LR=ON), and then sends the location registration signal. Hence, the normal location registration sequence is executed, and the location information on the mobile station MS is registered in the home location register HLR. Then, the base station $BSS_3$ continues to send the location registration executing request information (LR=ON) until the predetermined time T elapses, so that all the mobile stations in the sector 3 can be registered in the home location register HLR. When the predetermined time T elapses, the base station $BSS_3$ returns the value of the location registration timer part in the broadcast information to the original value (the location registration executing request LR=OFF).

Then, the second base station $BSS_2$ sends, for the predetermined time T, the broadcast information including the location registration timer PRT into which the location registration executing request information (LR=ON) is inserted. The mobile station MS located in the sector 2 (radio zone $C_2$) receives the location registration executing request information (LR=ON), and then sends the location registration signal. Hence, the normal location registration sequence is executed, and the location information on the mobile station MS is registered in the home location register HLR. Then, the base station $BSS_2$ continues to send the location registration executing request information (LR=ON) until the predetermined time T elapses, so that all the mobile stations in the sector 2 can be registered in the home location register HLR. When the predetermined time T elapses, the base station $BSS_2$ returns the value of the location registration timer part in the broadcast information to the original value (the location registration executing request LR=OFF). Similarly, the third base station $BSS_1$ sends, for the predetermined time T, the broadcast information including the location registration timer PRT into which the location registration executing request information (LR=ON) is inserted. Hence, all the mobile stations located in the sector 1 are registered in the home location register HLR.

In parallel with the above process, the base stations $BSS_4$–$BSS_6$ operate in the same way as described above, and the location information concerning all the mobile stations in the location registration area $PRA_2$ is registered in the home location register HLR.

As described above, the mobile stations are grouped in groups equal in number to the base stations and the location registration of the mobile stations is carried out in order of groups one by one so that two or more groups are not concurrently be subjected to the location registration. Hence, it is possible to prevent abnormal traffic from occurring when the contents of the home location register HLR are restored and to efficiently utilize the system resources.

Figure 7:
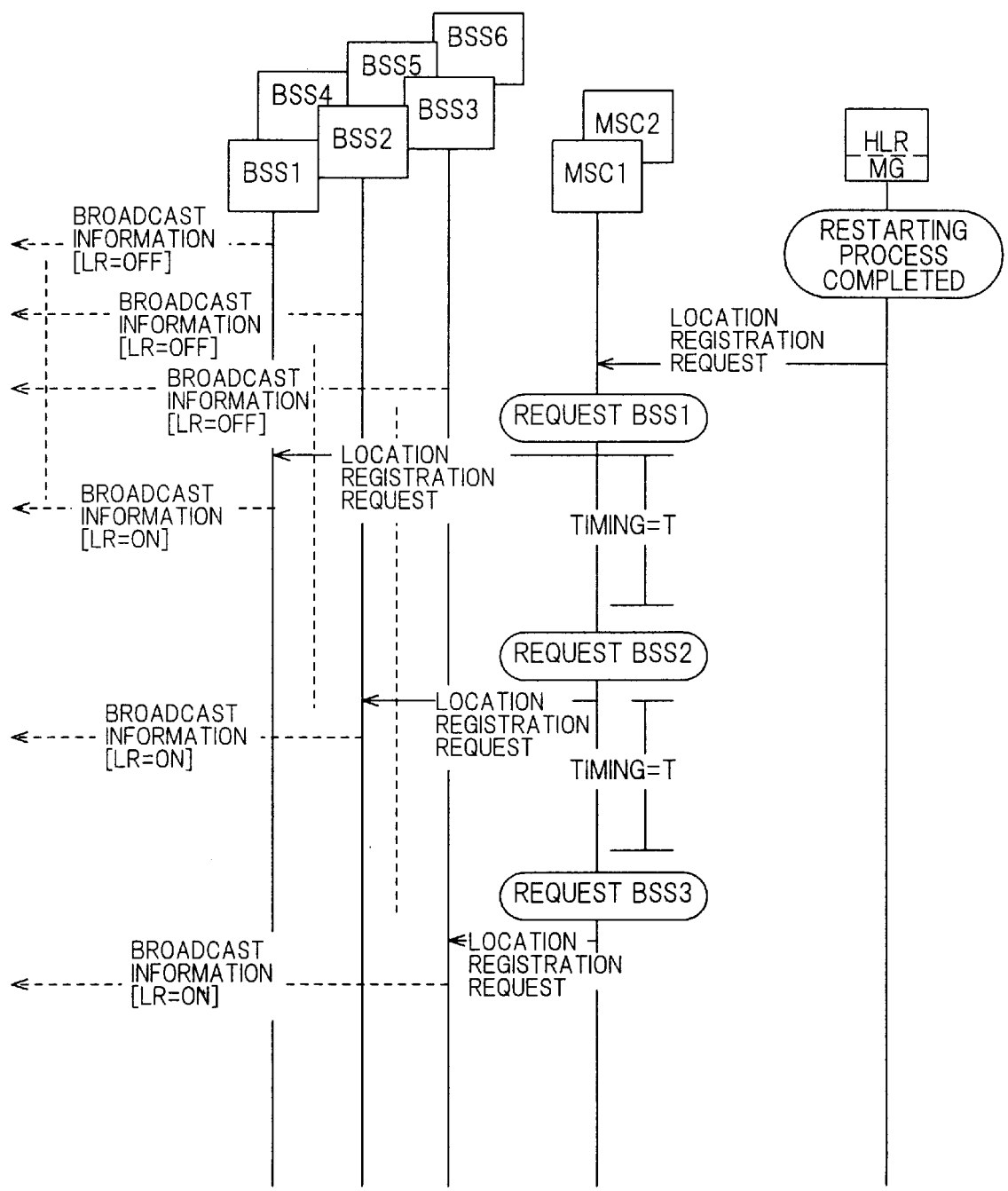
FIG. 7 is a diagram of a location registration sequence which is executed at the time of restarting the home location register HLR according to a fourth embodiment of the present invention.

(e) Location Registration Executed at the time of Restarting the Home Location Register HLR according to the Fourth Embodiment:

FIG. 7 shows a location registration sequence executed at the time of restarting the home location register HLR according to the fourth embodiment of the present invention. In the fourth embodiment, when the location registration requests are issued to the base stations $BSS_1$–$BSS_3$ ($BSS_4$–$BSS_6$) via one mobileservices switching center $MSC_1$ ($MSC_2$), the mobileservices switching center $MSC_1$ ($MSC_2$) sends, in order, the location registration request to the base stations $BSS_1$–$BSS_3$ ($BSS_4$–$BSS_6$) one by one at predetermined time intervals T, so that the location registration requests from the mobile stations can be dispersed.

The management part MG which manages the home location register HLR executes the restarting process for the home location register HLR due to a fault or the like, and sends the location registration request messages to all the mobileservices switching centers $MSC_1$–$MSC_2$ after the restarting process is completed.

Upon receiving the location registration request messages, the mobileservices switching centers $MSC_1$–$MSC_2$ send the location registration request messages to the base stations $BSS_1$–$BSS_3$ and $BSS_4$–$BSS_6$ in the predetermined order.

For example, the mobileservices switching center $MSC_1$ sends the location registration request message to the first base station $BSS_1$. Upon receipt of the location registration request message, the first base station $BSS_1$ sends, for a predetermined time T (for example, 10 seconds), the broadcast information including the location registration timer PRT into which the location registration executing request information (LR=ON) is inserted. The mobile station MS located in the radio zone $C_1$ receives the location registration executing request information (LR=ON), and then sends the location registration signal. Hence, the normal location registration sequence is executed, and the location information on the mobile station MS is registered in the home location register HLR. Then, the base station $BSS_1$ continues to send the location registration executing request information (LR=ON) until the predetermined time T elapses, so that all the mobile stations in the radio zone $C_1$ can be registered in the home location register HLR. When the predetermined time T elapses, the base station $BSS_1$ returns the value of the location registration timer part in the broadcast information to the original value (the location registration executing request LR=OFF).

Then, the mobileservices switching center $MSC_1$ sends the location registration request message to the second base station $BSS_2$. Upon receiving the location registration request message, the second base station $BSS_2$ sends, for the predetermined time T, the broadcast information including the location registration timer PRT into which the location registration executing request information (LR=ON) is inserted. The mobile station MS located in the radio zone $C_2$ receives the location registration executing request information (LR=ON), and then sends the location registration signal. Hence, the normal location registration sequence is executed, and the location information on the mobile station MS is registered in the home location register HLR. Then, the base station $BSS_2$ continues to send the location registration executing request information (LR=ON) until the predetermined time T elapses, so that all the mobile stations in the radio zone $C_2$ can be registered in the home location register HLR. When the predetermined time T elapses, the base station $BSS_2$ returns the value of the location registration timer part in the broadcast information to the original value (the location registration executing request LR=OFF).

Similarly, the mobileservices switching center $MSC_1$ sends the location registration request message to the third base station $BSS_3$, which then sends, for the predetermined time T, the broadcast information including the location registration timer PRT into which the location registration executing request information (LR=ON) is inserted. Then, all the mobile stations located in the sector 3 are registered in the home location register HLR.

In parallel with the above process, the base stations $BSS_4$–$BSS_6$ operate in the same way as described above, and the location information concerning all the mobile stations in the location registration area $PRA_2$ is registered in the home location register HLR.

As described above, the mobile stations are grouped in groups equal in number to the base stations and the location registration of the mobile stations is carried out in order of groups one by one so that two or more groups are not concurrently be subjected to the location registration. Hence, it is possible to prevent abnormal traffic from occurring when the contents of the home location register HLR are restored and to efficiently utilize the system resources.

Figure 8:
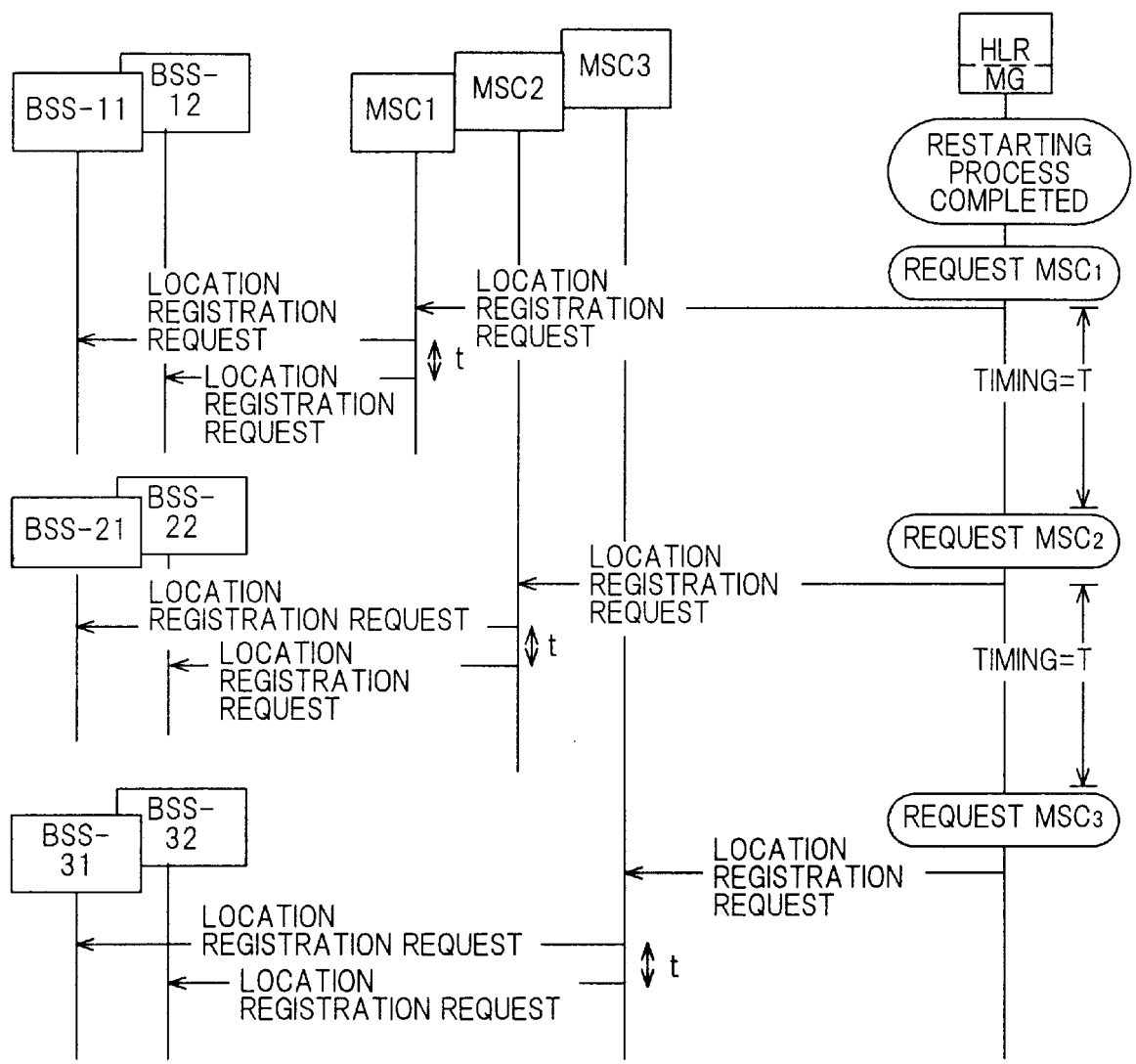
FIG. 8 is a diagram of a location registration sequence which is executed at the time of restarting the home location register HLR according to a fifth embodiment of the present invention.

(f) Location Registration at the time of Restarting the Home Location Register HLR according to the Fifth Embodiment:

FIG. 8 shows a location registration sequence executed at the time of restarting the home location register HLR according to the fifth embodiment of the present invention.

In the fifth embodiment, when the location registration requests are issued to the base stations BSS-11–BSS-12, BSS-21–BSS-22, and BSS-31–BSS-32 via the mobileservices switching centers $MSC_1$–$MSC_3$, the management part MG which manages the home location register HLR issues, in order, the location registration requests to the mobileservices switching centers $MSC_1$–$MSC_3$ at the predetermined time intervals T after the restarting process is completed. Upon receiving the location registration requests, the mobileservices switching centers $MSC_1$–$MSC_3$ issue the location registration requests to the base stations BSS-11–BSS-12, BSS-21–BSS-22, and BSS-31–BSS-32 at the predetermined time intervals t in order.

For example, the mobileservices switching center $MSC_1$ receives the location registration request message first, and sends the location registration request message to the first base station BSS-11. Upon receiving the location registration request message, the base station BSS-11, for the predetermined time t, the broadcast information including the location registration timer PRT into which the location registration executing request information (LR=ON) is inserted. The mobile station MS located in the radio zone of the base station BSS-11 receives the location registration executing request information (LR=ON), and then sends the location registration signal. Hence, the normal location registration sequence is executed, and the location information on the mobile station MS is registered in the home location register HLR. Then, the base station BSS-11 continues to send the location registration executing request information (LR=ON) until the predetermined time t elapses, so that all the mobile stations in the radio zone of the base station BSS-11 can be registered in the home location register HLR. When the predetermined time T elapses, the base station BSS-11 returns the value of the location registration timer part in the broadcast information to the original value (the location registration executing request LR=OFF).

Then, the mobileservices switching center $MSC_1$ sends the location registration request message to the next base station BSS-12. Upon receiving the location registration request message, the second base station BSS-12 sends, for the predetermined period t, the broadcast information including the location registration timer PRT into which the location registration executing request information (LR=ON) is inserted. The mobile station MS located in the radio zone of the base station BSS-12 receives the location registration executing request information (LR=ON), and then sends the location registration signal. Hence, the normal location registration sequence is executed, and the location information on the mobile station MS is registered in the home location register HLR. Then, the base station BSS-12 continues to send the location registration executing request information (LR=ON) until the predetermined time t elapses, so that all the mobile stations in the radio zone of the base station BSS-12 can be registered in the home location register HLR. When the predetermined time T elapses, the base station BSS-12 returns the value of the location registration timer part in the broadcast information to the original value (the location registration executing request LR=OFF). Thereafter, the mobileservices switch center $MSC_1$ sends the location registration request message to the other base stations such as the third and fourth base stations, and registers the location information on the mobile stations.

When the time T elapses, the management part MG which manages the home location register HLR issues the location registration request to the next mobileservices switch center $MSC_2$, which issues the location registration request to the base stations BSS-21, BSS-22, . . . , at the predetermined intervals t in order. Upon receipt of the location registration request, the base stations send the location registration execution request which is set to ON. Hence, the location information on the mobile stations is registered in the home location register HLR. Thereafter, the management part MG which manages the home location register HLR issues the location registration request to the mobileservices switch center $MSC_3$ each time the time T elapses. Then, the mobileservices switch center $MSC_3$ issues the location registration request to the base stations BSS-31, BSS-32, . . . at the intervals t in order, so that the location information on the mobile stations can be registered in the home location register.

Figure 9:
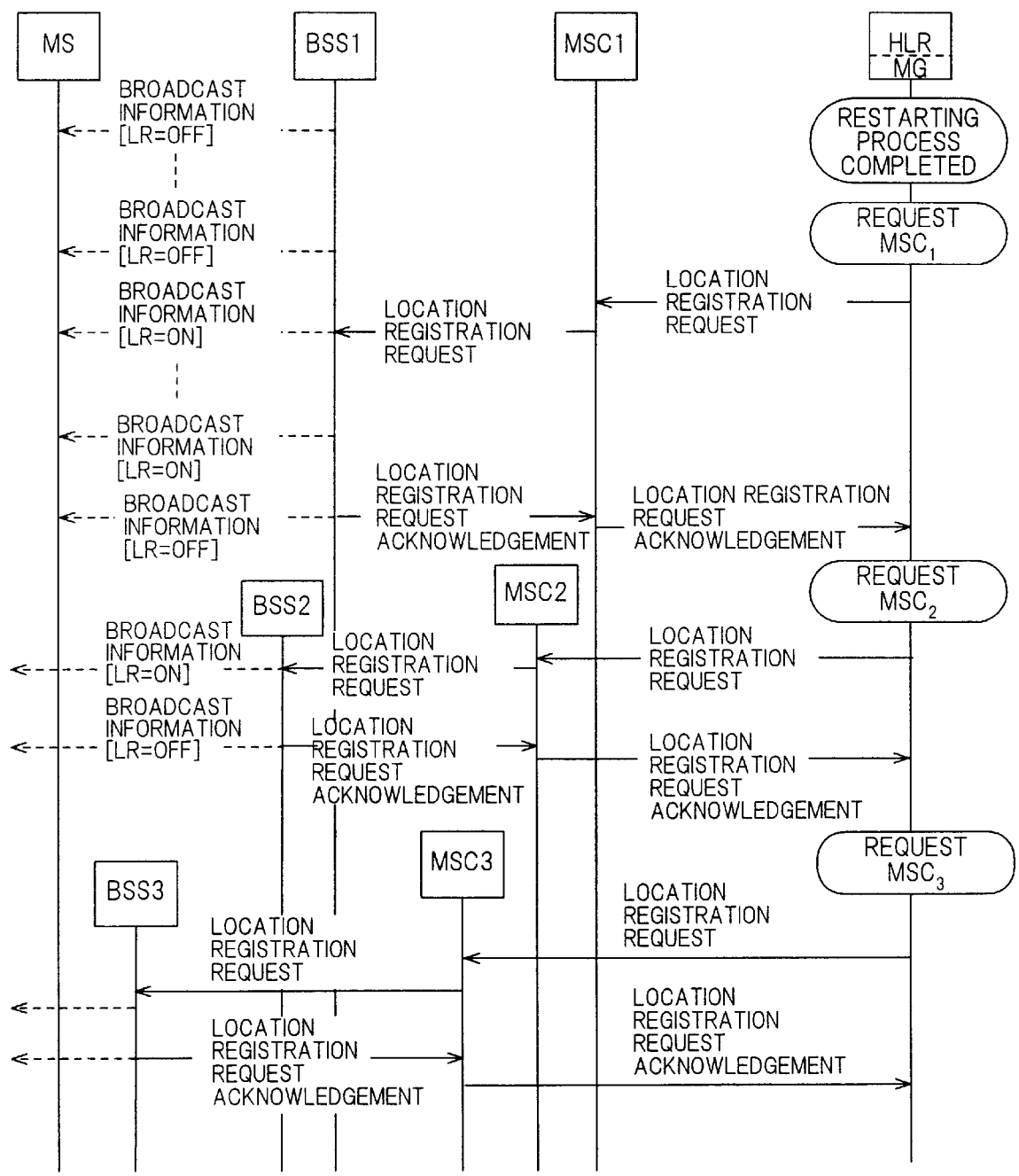
FIG. 9 is a diagram of a location registration sequence which is executed at the time of restarting the home location register HLR according to a sixth embodiment of the present invention.

(g) Location Registration at the time of Restarting the Home Location Register HLR according to the Sixth Embodiment:

FIG. 9 shows a location registration sequence executed at the time of restarting the home location register HLR according to the sixth embodiment of the present invention.

In the sixth embodiment of the present invention, the mobileservices switch center $MSC_1$ and base stations $BSS_i$ are switched each time the respective predetermined times elapse. According to the sixth embodiment of the present invention, the switching is carried out when an upper unit receives the location registration request acknowledgement signal. That is, the management part MG for the home location register HLR receives the location registration request acknowledgement signal, and then issues the location registration request to the next mobileservices switch center. The mobileservices switch centers $MSC_1$–$MSC_3$ send the location registration request messages to the base stations BSS-1–BSS-3 under the control thereof, and sends the location registration request acknowledgement signals to the management part MG upon receipt of these signals from the base stations BSS-1–BSS-3.

Figure 10:
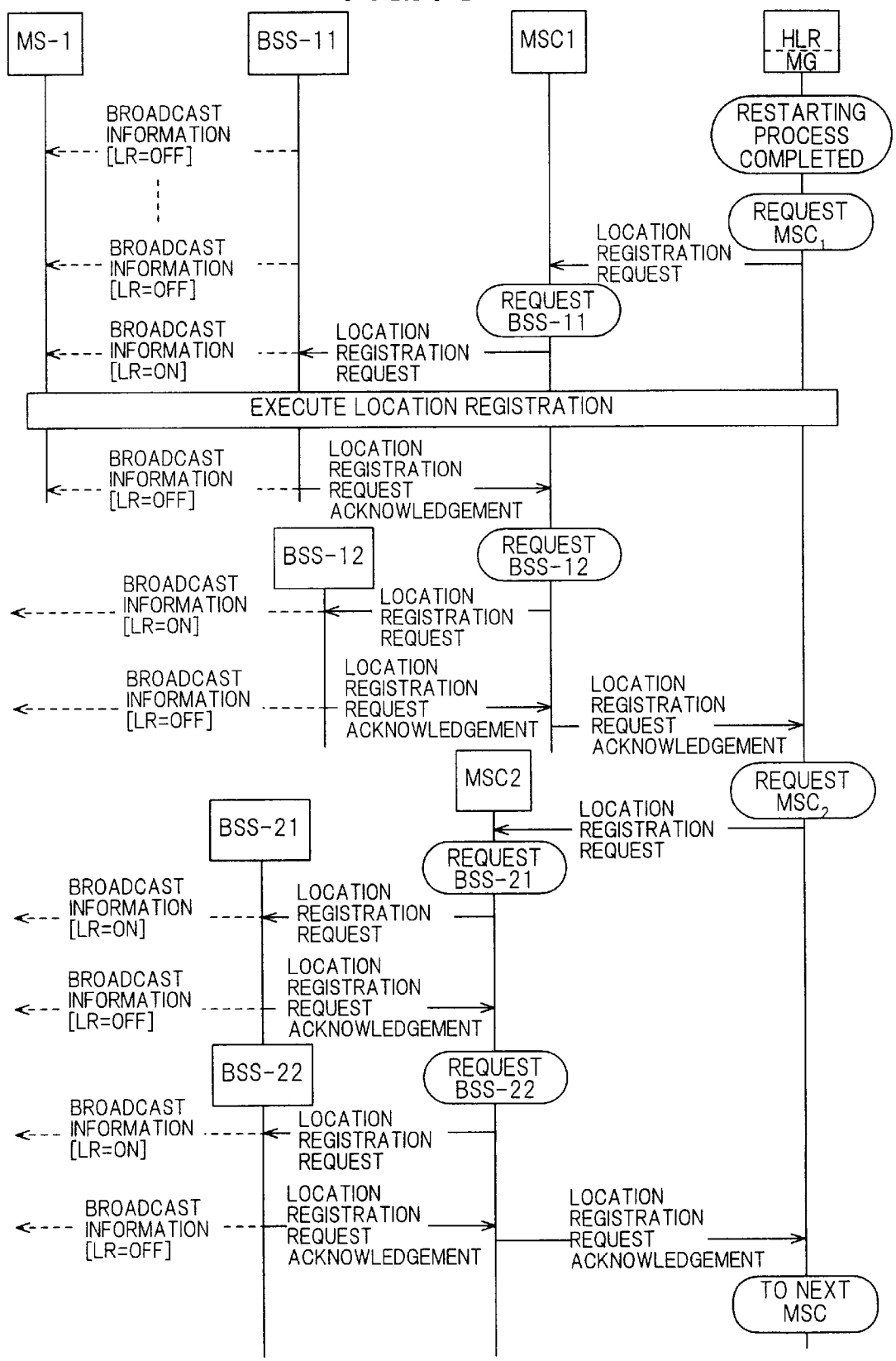
FIG. 10 is a diagram of a variation of the sixth embodiment of the present invention.
Figure 11:
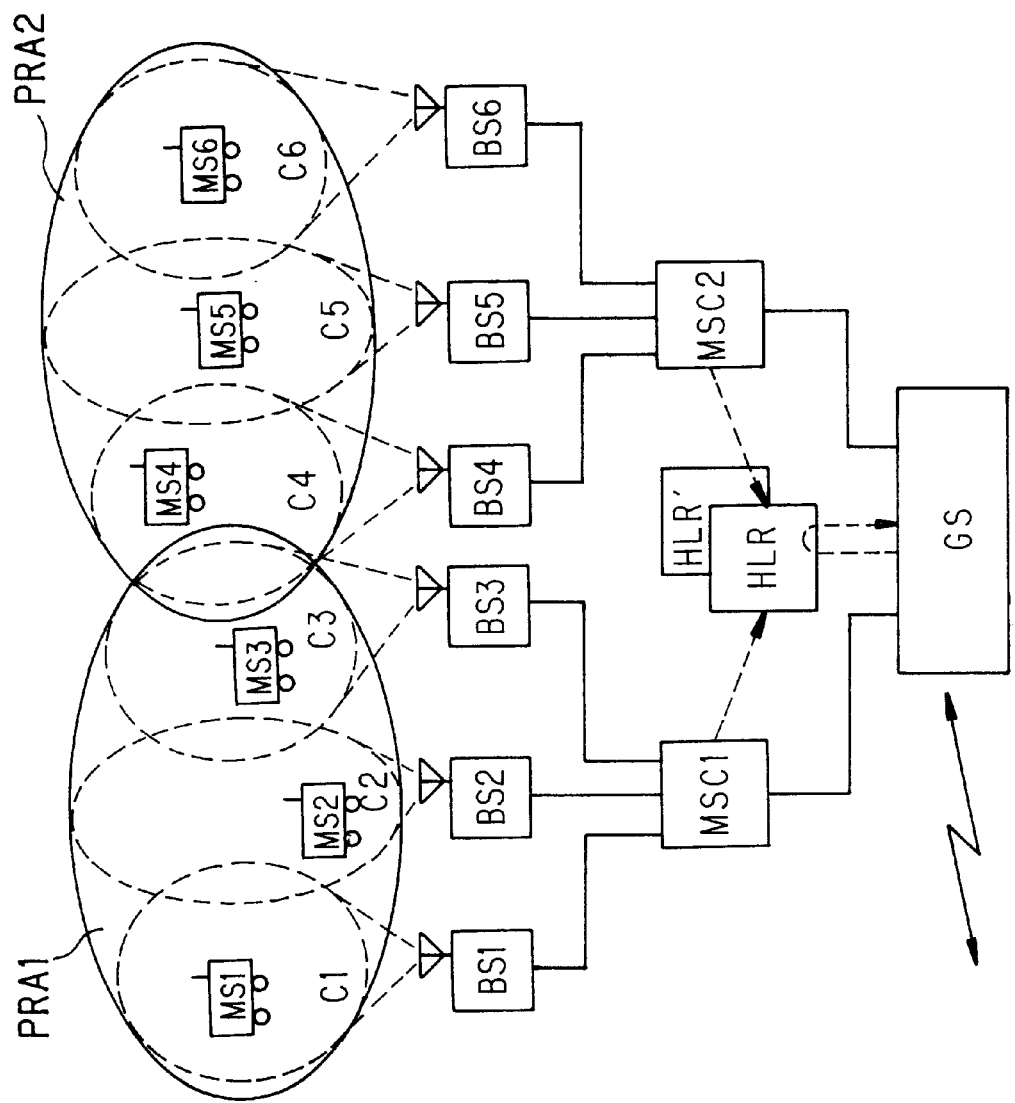
FIG. 11 is a diagram schematically showing a mobile radio system.
Figure 12:
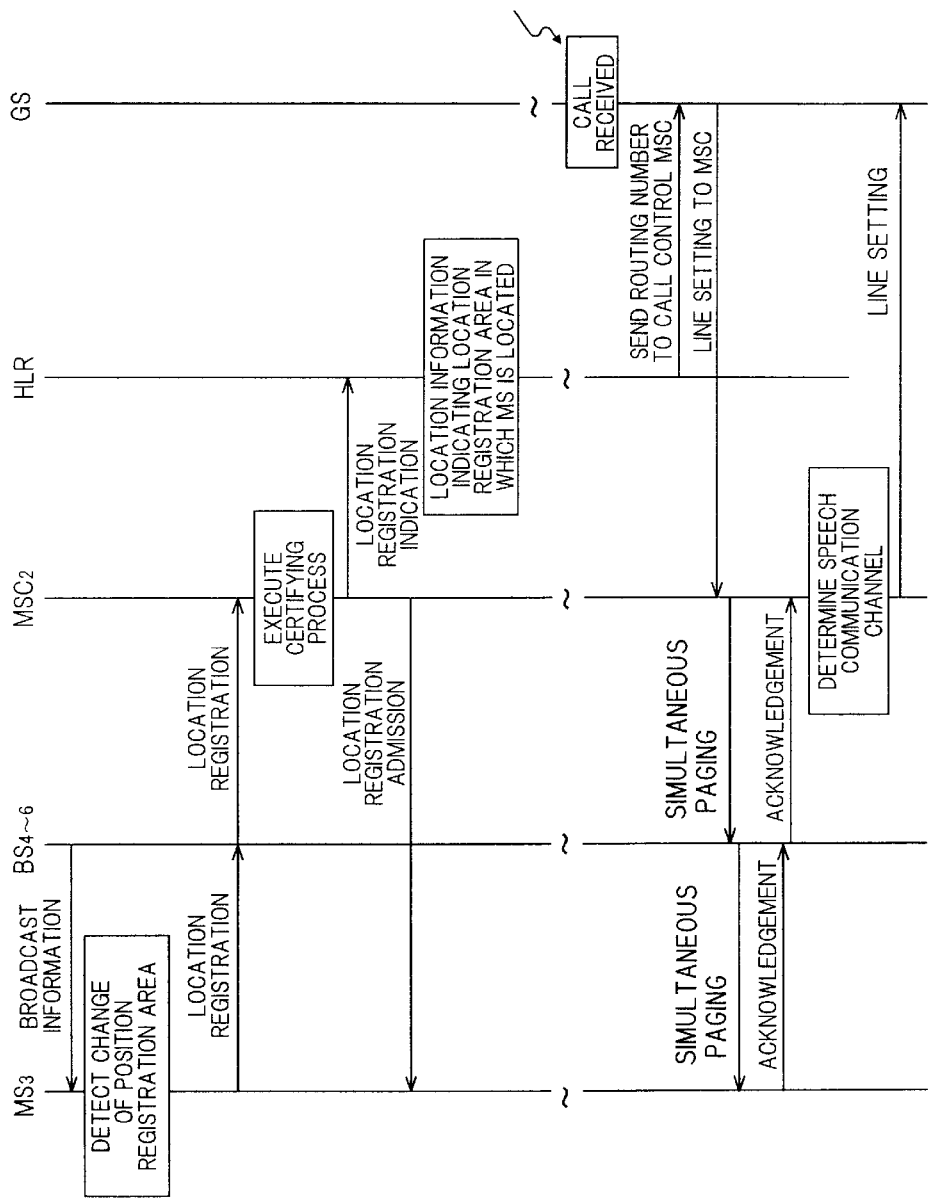
FIG. 12 is a diagram showing a location registration and call receiving sequence.
Figure 13:
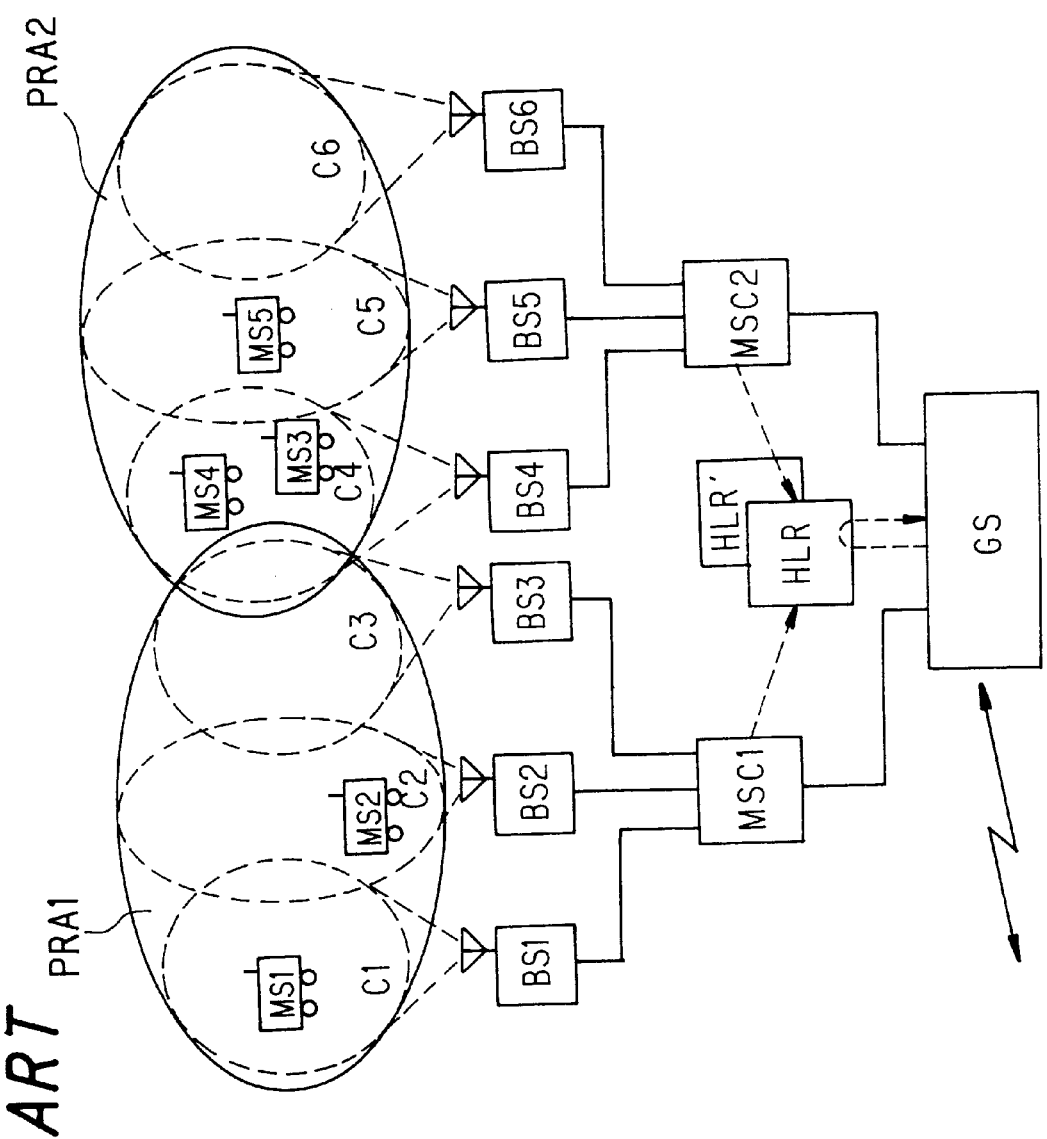
FIG. 13 is a diagram showing a location registration in which the location registration area is changed due to a movement.

FIG. 10 shows a variation of the sixth embodiment of the present invention. When the location registration requests are issued to the base stations BSS-11–BSS-12, BSS-21–BSS-22, and BSS-31–BSS-32 via the mobileservices switching centers $MSC_1$–$MSC_3$, the management part MG which manages the home location register HLR issues the location registration requests to the mobileservices switching centers $MSC_1$–$MSC_3$ after the restarting process is completed. Upon receiving the location registration requests, the mobileservices switching centers $MSC_1$–$MSC_3$ sends the location registration requests to the base stations BSS-11–BSS-21, BSS-12–BSS-22, and BSS-31–BSS-32. In this case, the management part MG for the home location register HLR receives the location registration request acknowledgement from the mobileservices switching center, and then sends the location registration request message to the next mobileservices switching center. Each of the mobileservices switching centers $MSC_1$–$MSC_3$ receives the location registration request acknowledgement, and sends the location registration request message to the next base station. If no next base station is available, each of the mobileservices switching centers $MSC_1$–$MSC_3$ sends the location registration request acknowledgement to the management part MG for the home location register HLR.

As described above, the upper unit which sends the location registration request message is not required to manage the switching time for the lower units, whereby the location registration control can be simplified. Further, the control shown in FIG. 10 arranges the mobile stations into an increased number of groups, so that occurrence of abnormal traffic can be prevented when the contents of the home location register HLR are restored, and thus the system resources can efficiently be utilized.

In the above-mentioned embodiments of the present invention, the location registration executing request information (LR=ON) is inserted into the location registration timer part PRT (see FIG. 3) of the broadcast information. Alternatively, it is possible to newly provide a location registration executing request information part in the broadcast information and insert the location registration executing request in the newly provided part.

According to the present invention, the mobile stations are urged to execute the location registration, so that the location information which was lost can rapidly and accurately be restored in the memory means (home location register HLR). Further, the location registration executing request information is merely substituted for the periodic location registration information included in the existing broadcast information. Hence, there is no need to create a newly defined message for indicating the location registration and to send and receive it. Thus, the location registration can easily be controlled and can be implemented without any modification of hardware.

According to the present invention, when the location information stored in the memory means (register HLR) should be restored after a fault occurs, a location registration request is issued to the base stations located in a location registration area associated with the memory means. The base stations which receive the location registration request send the broadcast information including location registration executing request information. The mobile stations which receive the location registration request, determine respective start timings at which execution of the location registration is started on the basis of identification numbers (for example, mobile identification numbers), each specifically assigned to and held in respective mobile stations. Then, the mobile stations send the location registration signal at the respective start timings. Hence, it is possible to arrange the timings for the location registration processes carried out by the mobile stations in dispersed formation. Hence, it is possible to prevent abnormal traffic from occurring when the contents of the home location register HLR are restored and to efficiently utilize the system resources.

According to the present invention, when the location information stored in the memory means (register HLR) should be restored after a fault occurs, a location registration request is issued to the base stations located in a location registration area associated with the memory means. The base stations which receive the location registration request send the broadcast information including location registration executing request information at predetermined time intervals in order. Then, the mobile stations which receive the location registration executing request information send the location registration signals. Hence, the mobile stations can be arranged in groups equal in number to the base stations, and the location registration can be carried out for each group in order. Hence, it is possible to prevent abnormal traffic from occurring when the contents of the home location register HLR are restored and to efficiently utilize the system resources.

According to the present invention, in a case where the location registration request is issued to the base stations via a plurality of mobileservices switching centers, the location registration request is issued to the mobileservices switching centers one by one at first time intervals in order. Then, the mobileservices switching centers which receive the location registration request issues the location registration request to the base stations at second time intervals in order. Hence, it is possible to arrange the mobile stations into an increased number of groups, whereby occurrence of abnormal traffic can be prevented when the contents of the home location register HLR are restored, and thus the system resources can efficiently be utilized.

According to the present invention, in a case where the location registration request is issued to the base stations located in a location registration area by a mobileservices switch center, the mobileservices switch center issues, upon receiving a location registration request acknowledgement from one base station, the location registration request to the next base station. Hence, the upper unit which sends the location registration request message is not required to manage the time for switching between the lower units, and can easily execute the location registration control.

As many apparently widely different embodiments of the present invention can be made without departing from the spirit and scope thereof, it is to be understood that the invention is not limited to the specific embodiments thereof except as defined in the appended claims.

What is claimed is:

1. A location registration method for a mobile radio communication system wherein information to be commonly supplied to all mobile stations is broadcasted by base stations, and each time a mobile station moves to a different location registration area, location information indicating a location registration area in which said mobile station is located is registered in memory means on the basis of a location registration signal sent by said mobile station, and wherein, when a call directed to a mobile station is received, simultaneous paging is carried out, on the basis of the location information read from the memory means, via the base stations located in a location registration area in which the called mobile station is located, said location registration method comprising the steps of:

issuing, when the location information stored in the memory means should be restored after a fault occurs, a location registration request to the base stations located in a location registration area associated with the memory means;

sending, from the base stations which receive the location registration request, the broadcast information including location registration executing request information;

sending the location registration signals from the mobile stations which receive said location registration executing request information; and restoring the location information into the memory means based upon the location registration signals from the mobile stations.

2. The location registration method as claimed in claim 1, wherein said location registration executing request information is substituted for periodic location registration information originally contained in the broadcast information.

3. A location registration method for a mobile radio communication system wherein information to be commonly supplied to all mobile stations is broadcasted by base stations, and each time a mobile station moves to a different location registration area, location information indicating a location registration area in which said mobile station is located is registered in memory means on the basis of a location registration signal sent by said mobile station, and wherein, when a call directed to a mobile station is received, simultaneous paging is carried out, on the basis of the location information read from the memory means, via the base stations located in a location registration area in which the called mobile station is located, said location registration method comprising the steps of:

issuing, when the location information stored in the memory means should be restored after a fault occurs, a location registration request to the base stations located in a location registration area associated with the memory means;

sending, from the base stations which receive the location registration request, the broadcast information including location registration executing request information;

determining, in mobile stations which receive the location registration executing request information, respective start timings at which execution of the location registration is started, on the basis of identification numbers each specifically assigned to and held in respective mobile stations;

sending the location registration signals from the mobile stations at the respective start timings; and restoring the location information into the memory means based upon the location registration signals from the mobile stations.

4. A location registration method for a mobile radio communication system wherein information to be commonly supplied to all mobile stations is broadcasted by base stations, and each time a mobile station moves to a different location registration area, location information indicating a location registration area in which said mobile station is located is registered in memory means on the basis of a location registration signal sent by said mobile station, and wherein, when a call directed to a mobile station is received, simultaneous paging is carried out, on the basis of the location information read from the memory means, via the base stations located in a location registration area in which the called mobile station is located, said location registration method comprising the steps of:

issuing, when the location information stored in the memory means should be restored after a fault occurs, a location registration request to the base stations located in a location registration area associated with the memory means;

sending, from the base stations which receive the location registration request, the broadcast information including location registration excuting request information at predetermined time intervals in order;

sending the location registration signals from the mobile stations which receive said location registration executing request information; and restoring the location information into the memory means based upon the location registration signals from the mobile stations.

5. The location registration method as claimed in claim 4, wherein, in a case where the location registration request is issued to the base stations located in the location registration area by a mobileservices switching center, said mobileservices switching center issues the location registration request to the base stations one by one at predetermined time intervals in order.

6. The location registration method as claimed in claim 4, wherein:

in a case where the location registration request is issued to the base stations located in a plurality of location registration areas via a plurality of mobileservices switching centers each of which corresponds to each of the location registration areas, the location registration request is issued to the mobileservices switching centers at first time intervals in order; and each of the mobileservices switching centers which receive the location registration request issues the location registration request to the base stations located in the corresponding location registration area at second time intervals in order.

7. A location registration method for a mobile radio communication system wherein information to be commonly supplied to all mobile stations is broadcasted by base stations, and each time a mobile station moves to a different location registration area, location information indicating a location registration area in which said mobile station is located is registered in memory means on the basis of a location registration signal sent by said mobile station, and wherein, when a call directed to a mobile station is received, simultaneous paging is carried out, on the basis of the location information read from the memory means, via the base stations located in a location registration area in which the called mobile station is located, said location registration method comprising the steps of:

issuing, when the location information stored in the memory means should be restored after a fault occurs, a location registration request to a mobileservices switching center associated with the memory means;

issuing, by the mobileservices switching center, a location registration request to one of the base stations under control of the mobileservices switching center;

sending, from said one of the base stations which receive the location registration request, the broadcast information including location registration executing request information;

sending the location registration signals from said mobile stations which receive said location registration executing request information;

issuing the location registration request to a next one of the base stations after a location registration request acknowledgement sent by said one of the base stations is received; and restoring the location information into the memory means based upon the location registration signals from the mobile stations.

8. A mobile radio communication system wherein information to be commonly supplied to all mobile stations is broadcasted by base stations, and each time a mobile station moves to a different location registration area, location information indicating a location registration area in which said mobile station is located is registered in memory means on the basis of a location registration signal sent by said mobile station, comprising:

means for issuing, when the location information stored in the memory means should be restored after a fault occurs, a location registration request to the base stations located in a location registration area associated with the memory means; and means for sending, from the base stations which receive the location registration request, the broadcast information including location registration executing request information so that the mobile stations which receive said location registration executing request information can send the location registration signals; and means for restoring the location information into the memory means based upon the location registration signals from the mobile stations.

9. The mobile radio communication system as claimed in claim 8, wherein said location registration executing request information is substituted for periodic location registration information originally contained in the broadcast information.

10. A mobile station for using a mobile radio communication system, which register location information indicating a location registration area in memory means by a location registration signal in case of moving to a different location registration area, comprising:

means for receiving broadcast information including a location registration executing request information issued from base stations which receive location registration request, when the location information stored in the memory means should be restored after a fault occurs;

means for determining a start timing at which execution of the location registration is started, on the basis of identification number specifically assigned; and means for sending the location registration signal at the start timing.

11. A mobile radio communication system wherein information to be commonly supplied to all mobile stations is broadcasted by base stations, and each time a mobile station moves to a different location registration area, location information indicating a location registration area in which said mobile station is located is registered in memory means on the basis of a location registration signal sent by said mobile station, comprising:

means for issuing, when the location information stored in the memory means should be restored after a fault occurs, a location registration request to the base stations located in a location registration area associated with the memory means;

means for sending, from the base stations which receive the location registration request, the broadcast information including location registration executing request information at predetermined time intervals in order so that the mobile stations which receive said location registration executing request information can send the location registration signal; and means for restoring the location information into the memory means based upon the location registration signals from the mobile stations.

* * * * *